United States Patent [19]

Rouleau

[11] Patent Number: 5,347,897
[45] Date of Patent: Sep. 20, 1994

[54] GUIDE APPARATUS FOR AN ELONGATED WORKPIECE

[76] Inventor: Georges O. Rouleau, 14280 Westgate Dr., Redford, Mich. 48239

[21] Appl. No.: 162,657

[22] Filed: Dec. 7, 1993

Related U.S. Application Data

[62] Division of Ser. No. 921,950, Jul. 30, 1992, Pat. No. 5,282,403.

[51] Int. Cl.$^5$ .................... B23B 13/00; B23B 13/12
[52] U.S. Cl. ...................................... 82/164; 82/127
[58] Field of Search ............... 82/127, 162, 163, 164, 82/165, 170

[56] References Cited

U.S. PATENT DOCUMENTS

| | | | |
|---|---|---|---|
| 391,533 | 10/1888 | Howard | 82/164 |
| 850,035 | 4/1907 | Morgan | 82/164 |
| 1,738,027 | 12/1929 | Wood . | |
| 2,104,117 | 1/1933 | Findlater . | |
| 2,511,930 | 6/1950 | Martens . | |
| 2,547,529 | 4/1951 | Lichtenberg | 82/164 |
| 2,558,252 | 6/1951 | Ifanger . | |
| 2,587,929 | 3/1952 | Tyson . | |
| 2,593,706 | 4/1952 | Von Zelewsky . | |
| 2,601,716 | 7/1952 | Lamngham | 29/27 |
| 2,612,809 | 10/1952 | Shager | 82/164 |
| 2,621,809 | 10/1952 | Shager . | |
| 2,686,444 | 8/1954 | Reichl . | |
| 2,693,365 | 11/1954 | von Zelewsky | 82/165 |
| 2,759,735 | 8/1956 | Cross . | |
| 2,784,977 | 3/1957 | Dinsmore . | |
| 2,845,827 | 8/1958 | Brauer | 82/164 |
| 3,101,015 | 8/1963 | Schuetz . | |
| 3,216,717 | 11/1965 | Bagge et al. | 82/170 |
| 4,038,861 | 8/1977 | Hartkopf et al. . | |
| 4,470,285 | 9/1984 | Cattaneo et al. . | |
| 4,967,579 | 11/1990 | Haydo et al. . | |

FOREIGN PATENT DOCUMENTS 3240146 5/1984 Fed. Rep. of Germany .

*Primary Examiner*—William E. Terrell
*Attorney, Agent, or Firm*—Burns, Doane, Swecker & Mathis

[57] ABSTRACT

A guide apparatus for guiding an elongated rotary member comprises first and second plate members, each including a through-hole to define a longitudinal axis and a passage through-which the elongated member may pass. The second plate member is rotatable relative to the first plate member about the longitudinal axis. A bearing mechanism supports the second plate member for rotation and for preventing relative radial movement between the first and second plate members. A movable guiding mechanism comprises at least three guide fingers carrying a guide roller at their inner ends. The guide fingers are actuated by an air or hydraulic cylinder to swung radially inwardly such that the guide rollers contact the elongated rotary member. A pick-up finger is connected to one of the guide fingers to raise the elongated rotary member to the center of the passage. The bearing mechanism may comprise rotary elements which minimize friction between the first and second plate members. A stop device limits the extent to which the guide fingers can be swung inwardly toward the center of the passage. An adapter is provided for enabling elongated members of non-circular cross-section to be supported by the guide apparatus.

8 Claims, 14 Drawing Sheets

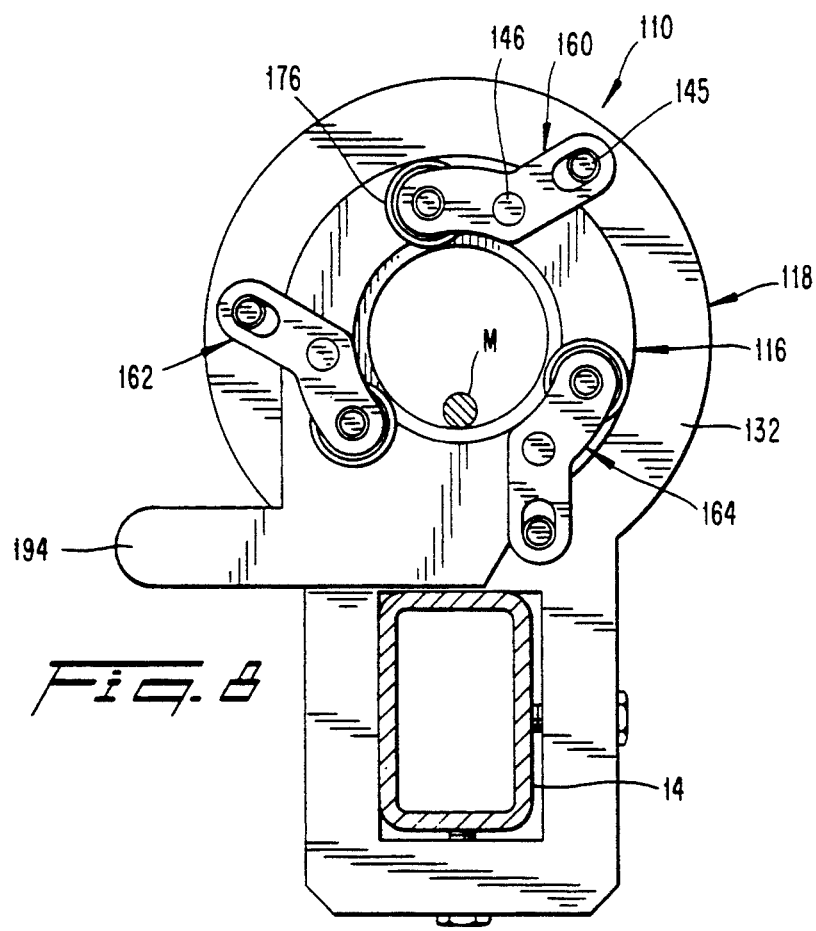
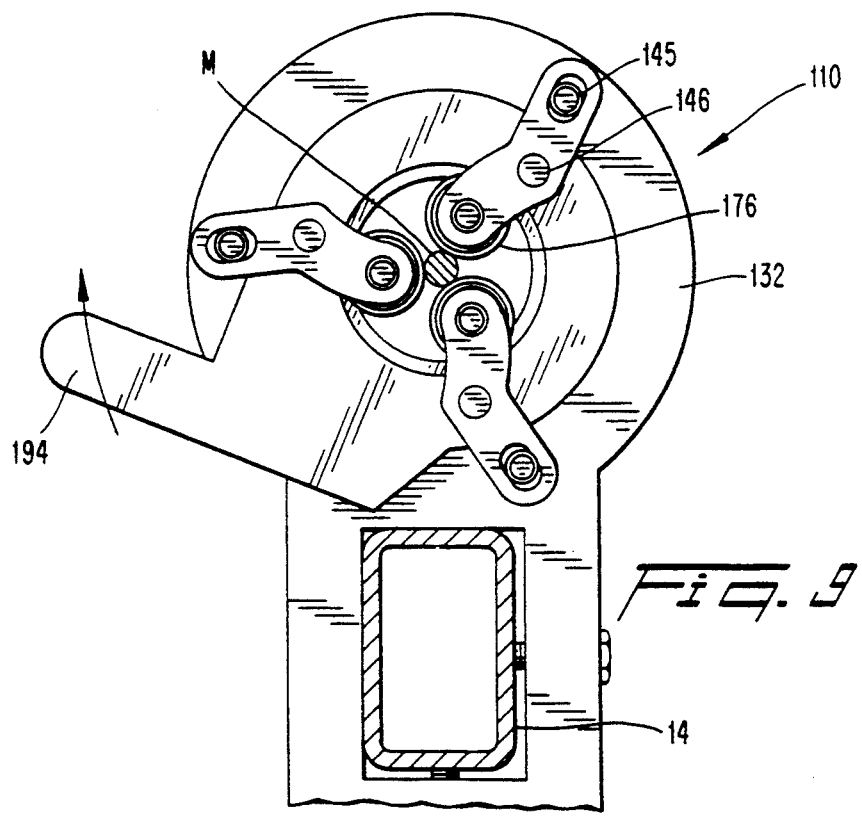

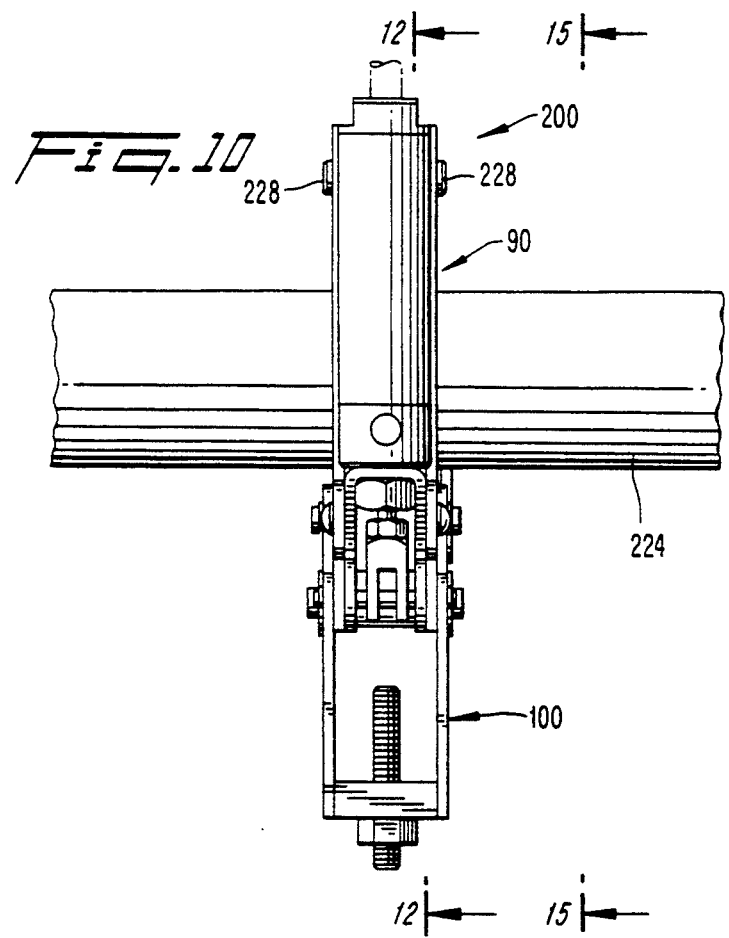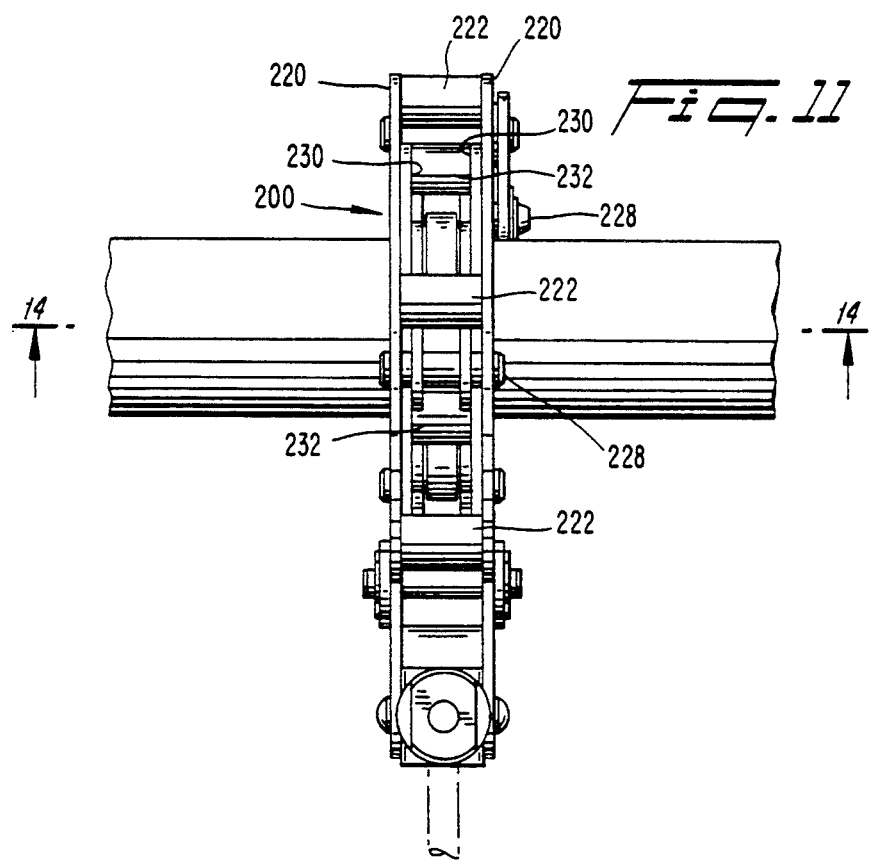

Fig.20
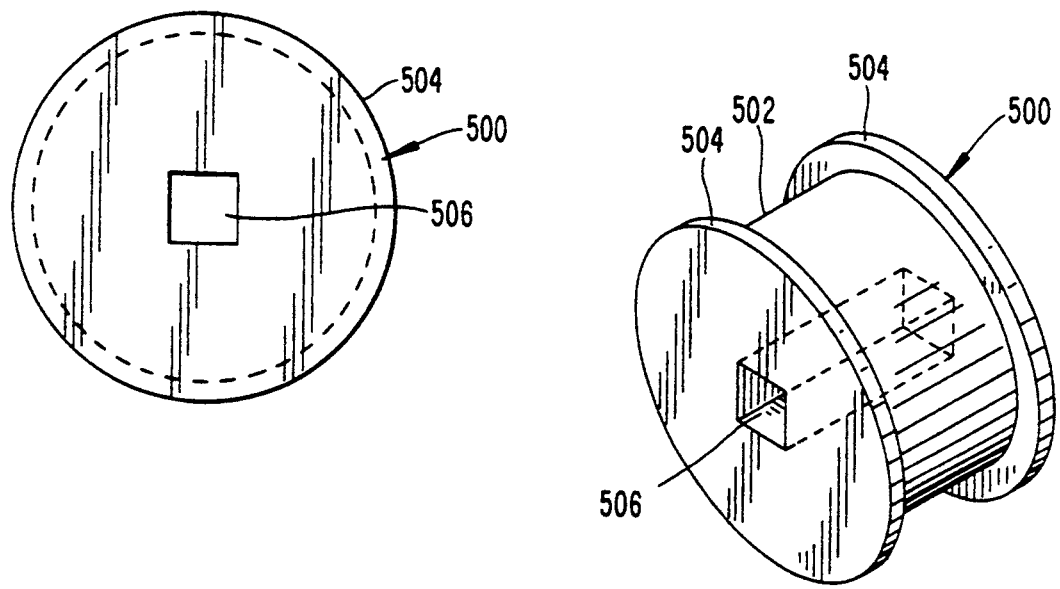
Fig.21
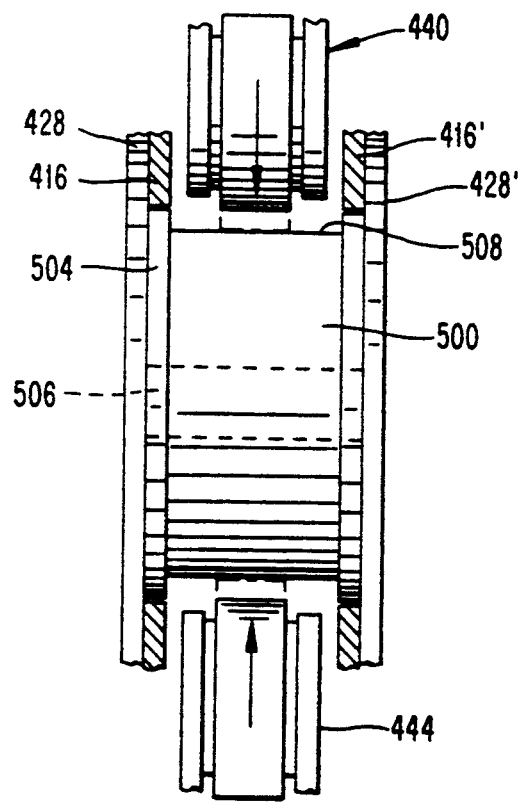
Fig.22
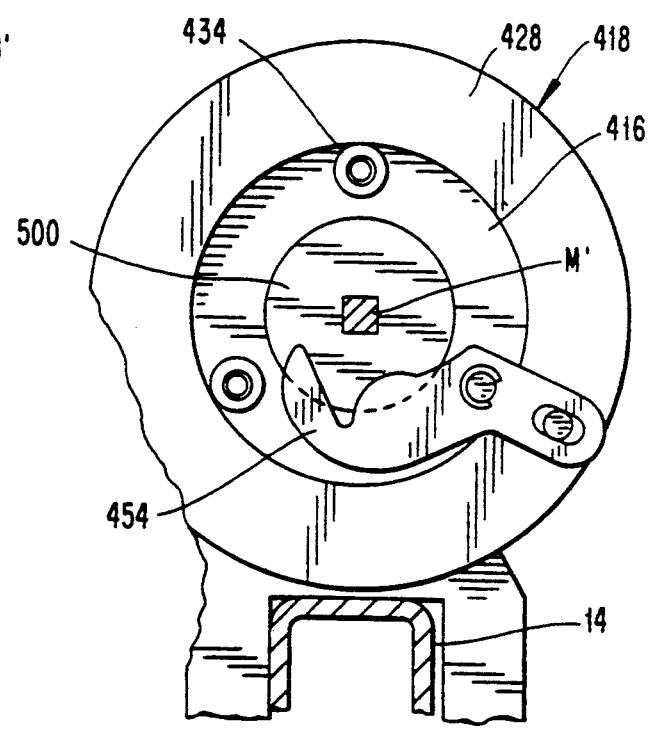
Fig.23

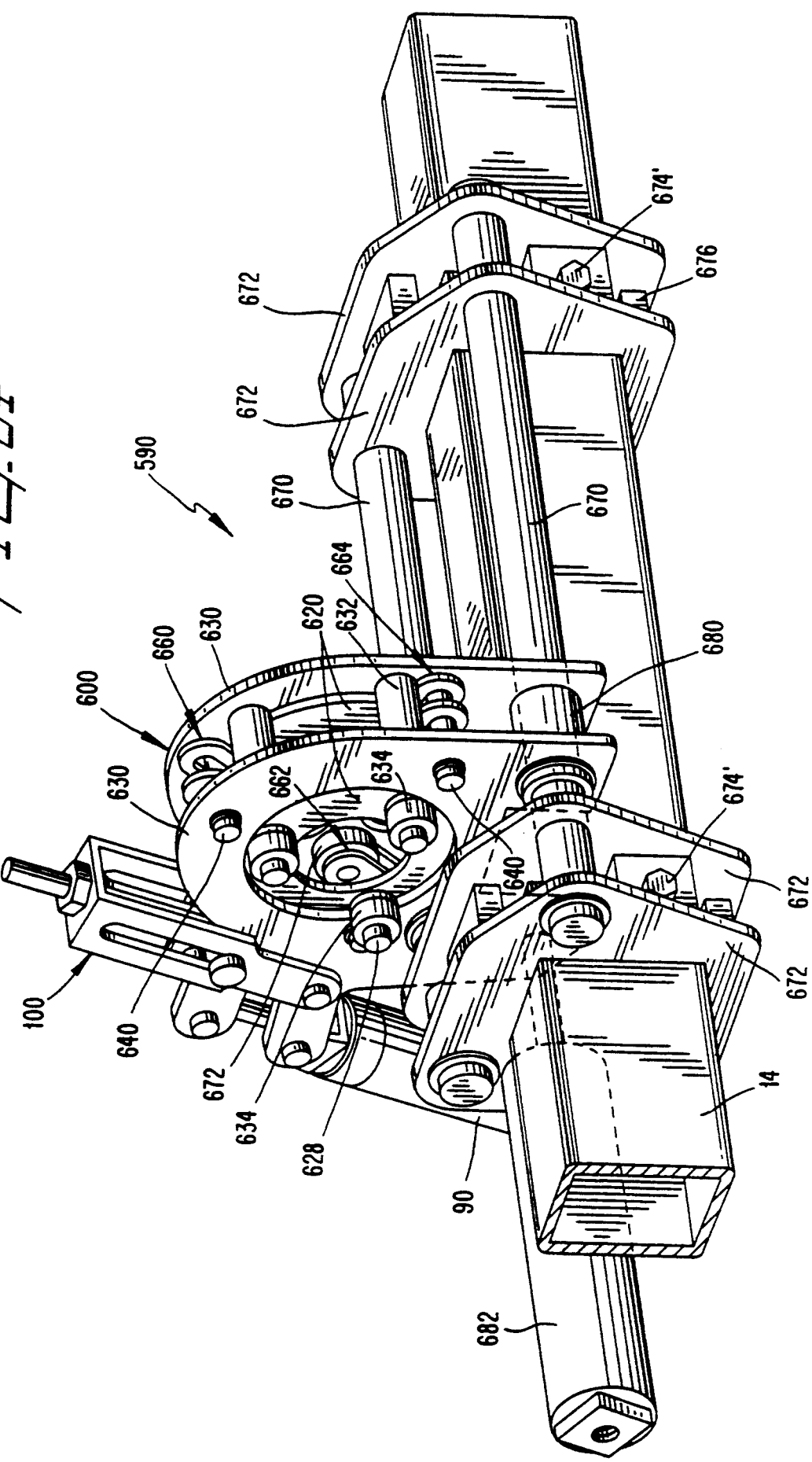

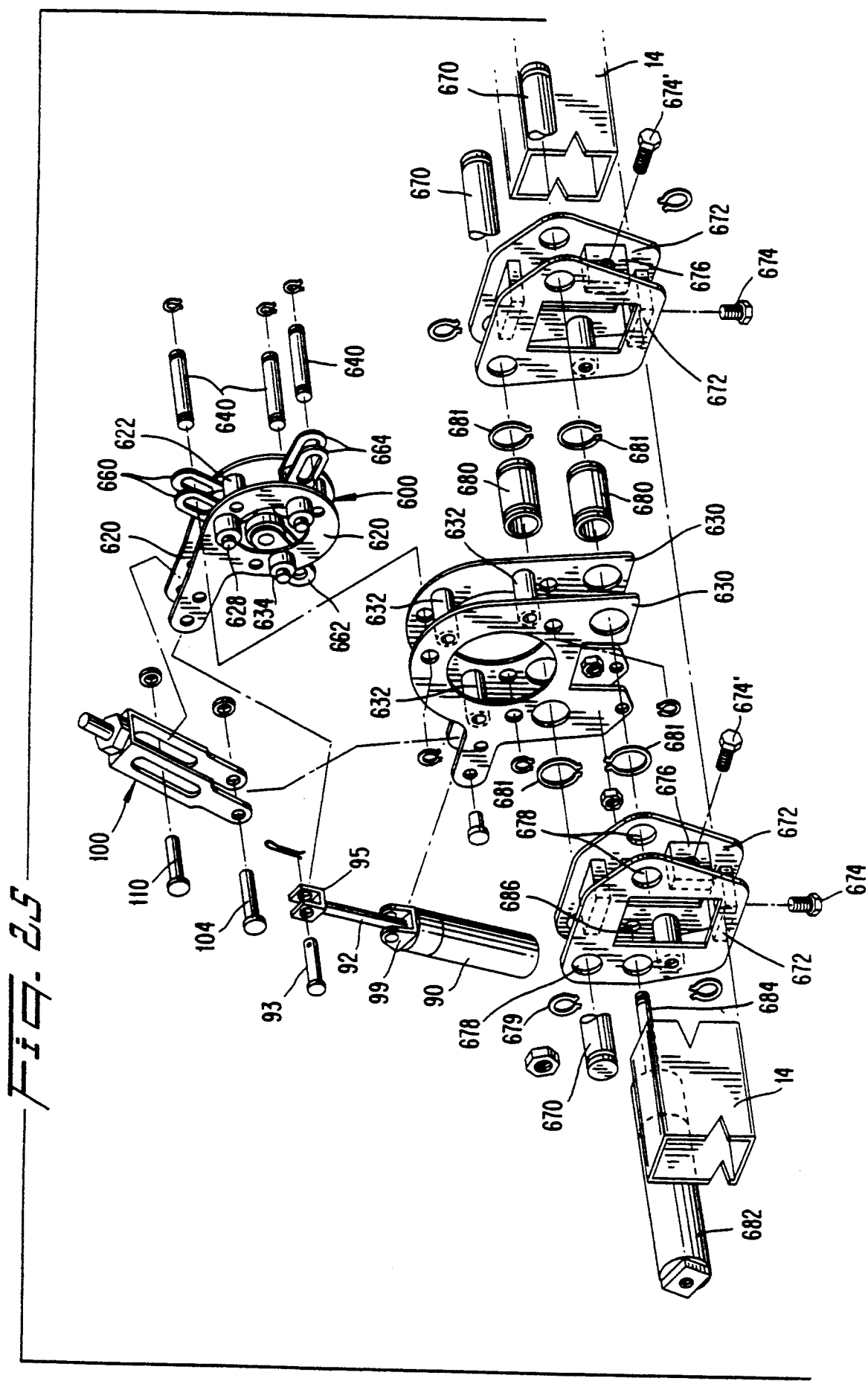

GUIDE APPARATUS FOR AN ELONGATED WORKPIECE

This application is a divisional of application Ser. No. 07/921,950, filed Jul. 30, 1992, now U.S. Pat. No. 5,282,403.

BACKGROUND OF THE INVENTION

The invention relates to guides for supporting elongated rotary elements, especially in metal working operations.

Certain metal working operations involve the longitudinal feeding of a long, narrow metal workpiece into a metal working machine, such as a single or multiple spindle automatic turning machine or other types of metal working machinery. These machines gradually advance the workpiece longitudinally while rotating the workpiece at high speed about its own longitudinal axis. The workpiece is supported along its length, e.g., by means of tubing through which the workpiece passes.

Due to its high rate of rotation, the workpiece tends to undergo a whipping action in which it is urged radially outwardly by centrifugal force and comes into contact with the inner surface of the tubing. The resulting noise is of such a high level as to constitute a health hazard to proximate operators.

Efforts to reduce the noise level have included the insertion of sound-damping plastic liners inside the steel tubes, or utilizing a specially designed tube in which the stock turns within pressurized hydraulic oil. Although those efforts have been somewhat helpful, the plastic insert tubes wear out, and the hydraulic pressurized tubes are costly.

A guide apparatus has previously been proposed in Reichl U.S. Pat. No. 2,686,444 in which three guide rolls are arranged for displacement toward and away from a rotary workpiece which extends through the guide. Two of the rollers are carried by crank levers which are pivoted on a stationary housing. The third roll is mounted on a reciprocating frame which is connected to the crank levers by gear teeth so that the levers are rotated toward the workpiece in response to reciprocating of the frame. Such a structure is relatively complex in that it requires the use of gear teeth and a heavy duty actuator for reciprocating the relatively heavy frame.

Therefore, it would be desirable to provide a relatively simple and inexpensive guide which supports a rotating/advancing workpiece along its length in a manner permitting the workpiece to rotate freely at high speed without moving radially. The guide should also be adaptable to workpieces of different cross-sectional sizes, and preferably be able to accommodate workpieces of non-circular cross-section.

SUMMARY OF THE INVENTION

The present invention relates to a guide apparatus for an elongated rotary member. The apparatus comprises first and second plate members, each including a through-hole. The through-holes define a longitudinal axis and a passage for receiving the elongated rotary member. The second plate member is rotatable relative to the first plate member about the longitudinal axis. A bearing apparatus is provided for supporting the second plate member for rotation about the longitudinal axis, and for preventing relative radial movement between the first and second plate members. A movable guide mechanism is provided which comprise at least three guide fingers. Each guide finger is operably connected to both of the first and second plate members for swinging movement such that rotation of the second plate member causes a radial inner end of the guide finger to move toward and away from the center line of the longitudinal axis. A guide roller is mounted on the inner end of each of the guide fingers for free rotation relative thereto about an axis extending substantially parallel to the longitudinal axis. A power actuating mechanism is connected to a second plate member for applying a rotary force which produces rotary motion of the second plate member relative to the first plate member about the longitudinal axis for swinging the guide fingers outwardly in order to release the elongated member, and inwardly for clamping and centralizing the elongated member.

Preferably, the bearing mechanism comprises a plurality of pins spaced longitudinally about the longitudinal axis. The second plate member could directly contact those pins, or alternatively, contact rotary bearing sleeves mounted on the pins to minimize wear. The bearings are slidable from the ends of the pins to facilitate their replacement. Alternatively, a roller or ball bearing comprised of inner and outer races may be employed.

A pick-up finger is preferably connected to the second plate member and is mounted for movement from a lower position to an upper position for raising the elongated rotary member into a guide region defined between the guide rollers when the guide rollers are moved to their guiding positions.

An adjustable stop is provided which limits the extent to which the guide rollers can be moved radially inwardly. This prevents the guide rollers from approaching one another after the elongated member has passed from between those rollers.

An adapter is provided which can be mounted so as to be gripped by the guide rollers. The adapter includes a through-hole of non-circular cross-sectional shape for receiving a correspondingly shaped elongated member. The adapter and elongated member rotate together during the metal working operation.

The guide apparatus may be mounted to a rail such that the center passage of the guide apparatus is spaced laterally from the rail. Alternatively, the guide apparatus may be mounted on a cylindrical support tube such that the support tube passes through the center passage of the guide apparatus. The support tube is provided with openings therein to enable the guide fingers to be passed radially through the support tube.

By making the guide apparatus reciprocable in a direction parallel to the longitudinal axis, and providing means for effecting such reciprocation, the guide apparatus can function as a shuttle to longitudinally advance the elongated member in stepwise fashion.

BRIEF DESCRIPTION OF THE DRAWINGS

The objects and advantages of the invention will become apparent from the following detailed description of preferred embodiments thereof in connection with the accompanying drawings, in which like numerals designate like elements, and in which:

FIG. 8 is a front elevational view of a second embodiment of the invention with the guide fingers disposed in a non-guiding position;

FIG. 9 is a view similar to FIG. 8 after the guide fingers have been swung to a guiding position;

FIG. 10 is a side edge view of a third embodiment of a guide apparatus according to the present invention.

FIG. 11 is a top plan view of the apparatus depicted in FIG. 10;

FIG. 20 is an end view of an adapter component of the present invention;

FIG. 21 is a perspective view of the adapter depicted in FIG. 20;

FIG. 22 is a longitudinal sectional view through a guide apparatus depicting the manner in which the adapter is mounted within the guide apparatus;

FIG. 23 is a front elevational view of a guide apparatus depicting the adapter mounted therein;

FIG. 24 is a perspective view of a guiding apparatus being used as a shuttle device; and FIG. 25 is an exploded perspective view of the shuttle device depicted in FIG. 24.

DETAILED DESCRIPTION OF THE PREFERRED EMBODIMENTS

Figure 1:
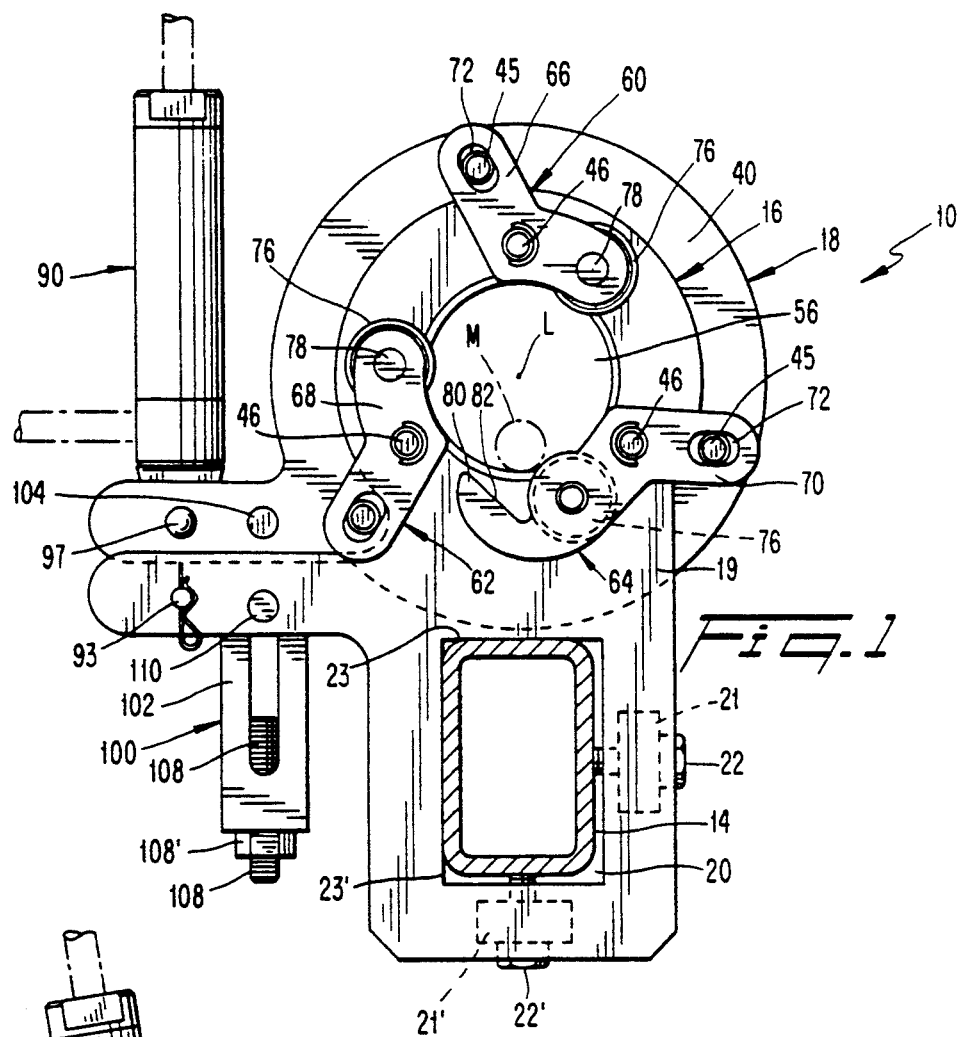
FIG. 1 is front elevational view of a first embodiment of a guide apparatus according to the present invention, with the guide fingers thereof disposed in a non-guiding position.

Depicted in FIGS. 1–7 is a first preferred embodiment of a guide apparatus 10 for an elongate rotary element M (FIG. 1).

Figure 7:
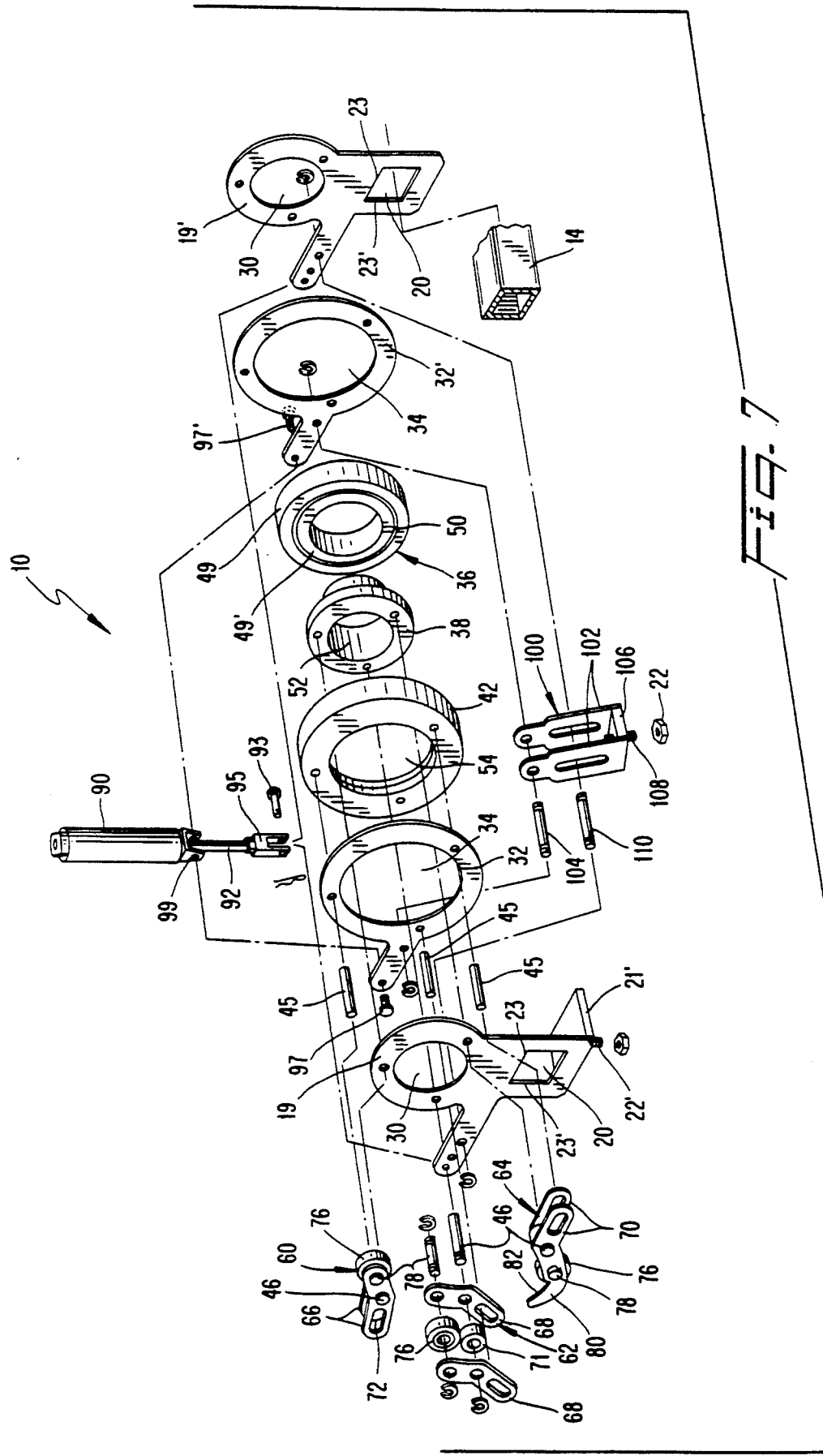
FIG. 7 is an exploded perspective view of the apparatus depicted in FIGS. 1–6.

The guide apparatus (FIG. 7) is mounted on a fixed support rail 14 which has a rectangular cross-section and extends parallel to the elongated member M. The guide apparatus 10 comprises first and second plate members in the form of plate assemblies 16, 18 (FIG. 5), the first plate assembly being non-rotatable, and the second plate assembly being rotatable about a longitudinal axis L which is parallel to the rail M (FIG. 1). The first plate assembly 16 (FIG. 5) includes two identical longitudinally spaced generally ring-shaped plates 19, 19' (FIG. 7). Lower portions of the rings 19, 19' include rectangular cutouts 20 which are of larger cross-section than the rail 14. A spacer 21 (FIG. 1) interconnects adjacent vertical legs of the rings 19, 19' (FIG. 7) and a spacer 21' interconnects adjacent horizontal legs of the ring 19, 19' (FIG. 7).

Bolts 22, 22' (FIG. 1) are threadedly mounted in the spacers 21, 21' respectively, and are arranged to bear against respective sides of the rail 14. In that manner, two edges 23, 23' of each recess 20 can be pressed against respective sides of the rail 14, so that the guide 10 can be precisely located relative to the rail. An upper portion of each plate 19, 19' (FIG. 7) is of circular configuration and contains a central hole 30.

The holes 30 of both plates 19, 19' are aligned with one another along the longitudinal center line axis L (FIG. 1). That axis L corresponds to a direction of feed of the elongated rotary member M. The second plate assembly 18 (FIG. 5) is disposed in a spaced formed between the first plates 19, 19' (FIG. 7). The second plate assembly 18 (FIG. 5) comprises a pair of longitudinally spaced second ring-shaped plates 32, 32' (FIG. 7) which include central holes 34 aligned axially with the central holes 30 of the first plates 19, 19'.

Figure 6:
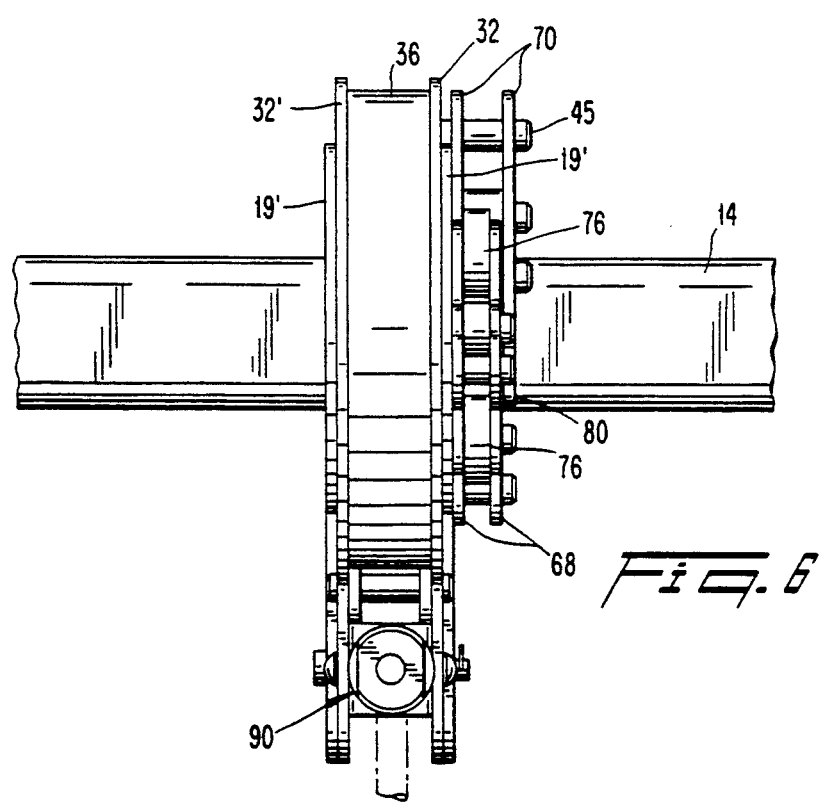
FIG. 6 is a top plan view of the apparatus depicted in FIG. 1.

Connected to the first and second plate assemblies 16, 18 (FIG. 1) is a bearing assembly 36 (FIG. 7). The bearing assembly 36 includes inner and outer bushings 38, 42. The inner bushing 38 is assembled by press fit to an inner bearing race 49' and outer bushing 42 is assembled by press fit to an outer bearing race 49. The outer bushing 42 is assembled to plates 32 and 32' by stitch welding the outer part of bushing 42 to plates 32 and 32' (FIG. 6). Rollers 50 are disposed between the races 49, 49' (FIG. 7).

The plates 19, 19' (FIG. 7) are assembled to inner bushing 38 by stitch welding the inner part of plates 19, 19' to bushing 38. The inner race 49' is thus affixed to the non-rotary first plates 19, 19', and the outer race 49 is rotatable with the rotatable plates 32, 32'. The plates 19, 19' extend radially outwardly beyond the inner race 49' to define therebetween an annular channel in which the outer race 49 is disposed and axially constrained.

The outer and inner bushings 38, 42 include central holes 52, 54 respectively, which are aligned with the holes 30, 34 of the plate members 19, 19', 32, 32' to define a central longitudinal passage 56 (FIG. 1) which is coaxial with the longitudinal axis L.

The first plate assembly 16 (FIG. 1) carries three circumferentially spaced guide fingers 60, 62, 64 (FIG. 7). Each guide finger comprises a pair of arms 66, 68, 70, each pair of arms being rotatably mounted to a pin 46 which connects the inner bushing 38 to the first plates 19, 19'. The arms of each pair of arms are separated by spacers 71, and each arm 66, 68, 70 has a slot 72 formed in a radially outer end thereof.

Each slot 72 receives a pin 45 which passes through holes in plates 32, 32' and which is assembled to bushing 42 by a press-fit. Pins 45 constitute a drive for rotating the guide fingers, as will be explained. The pins 45, 46 define secondary axes to which the guide fingers are rotatably mounted.

Mounted to the radially inner end of each pair of arms 66, 68, 70 is a guide bearing or guide roller 76 (FIG. 7). Each guide roller rotates freely about an axle 78, which extends between the arms of its respective guide finger 66, 68, 70 in a direction parallel to the longitudinal axis L.

When the second plates 32, 32' (FIG. 7) are rotated relative to the first plates 19, 19' the drive pins 45 revolve about the longitudinal axis, thereby causing the guide fingers to rotate about their pivot pins 46 from non-guiding, to guiding positions.

Figure 2:
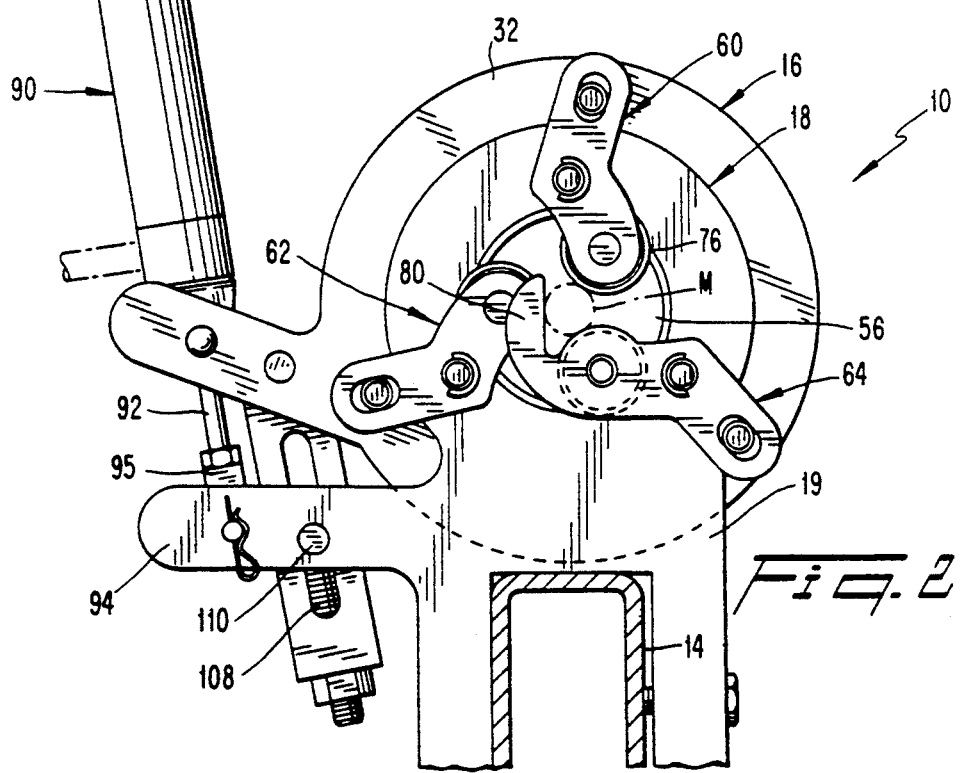
FIG. 2 is a view similar to FIG. 1 after the guide fingers have been displaced to a guiding position.
Figure 3:
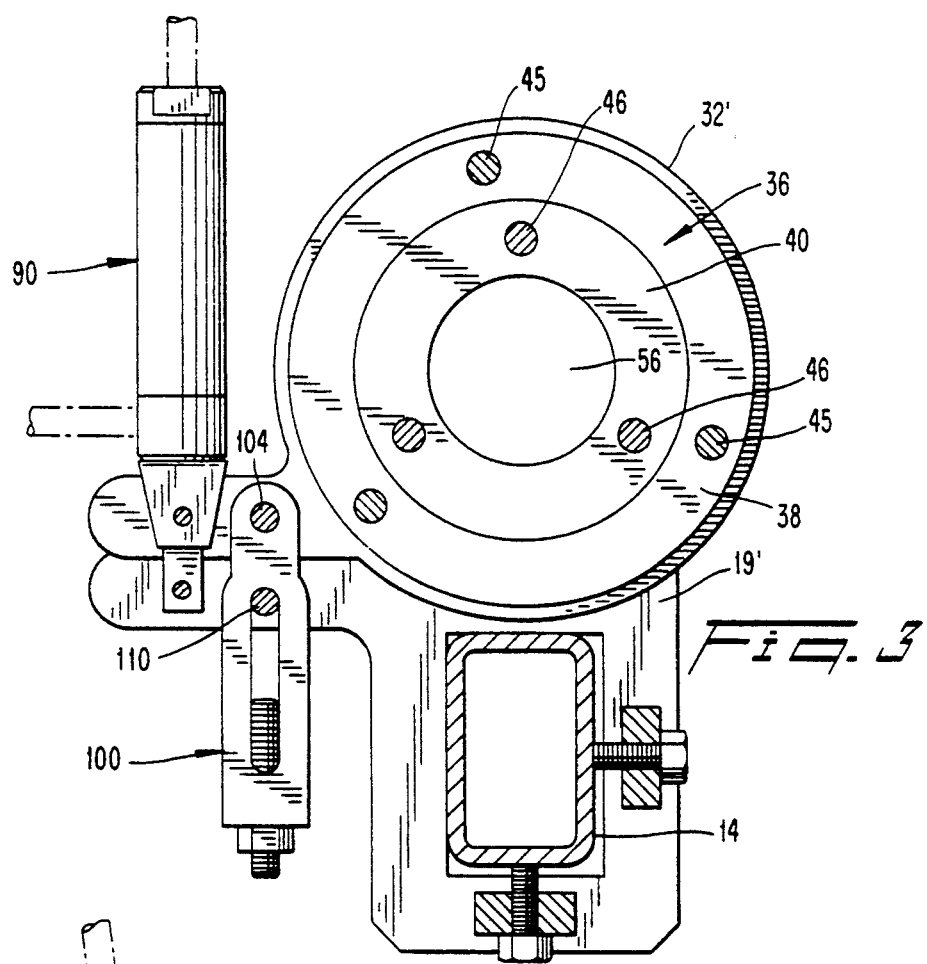
FIG. 3 is a view similar to FIG. 1 with the guide fingers and two plates being removed to expose the interior of the guide apparatus.
Figure 4:
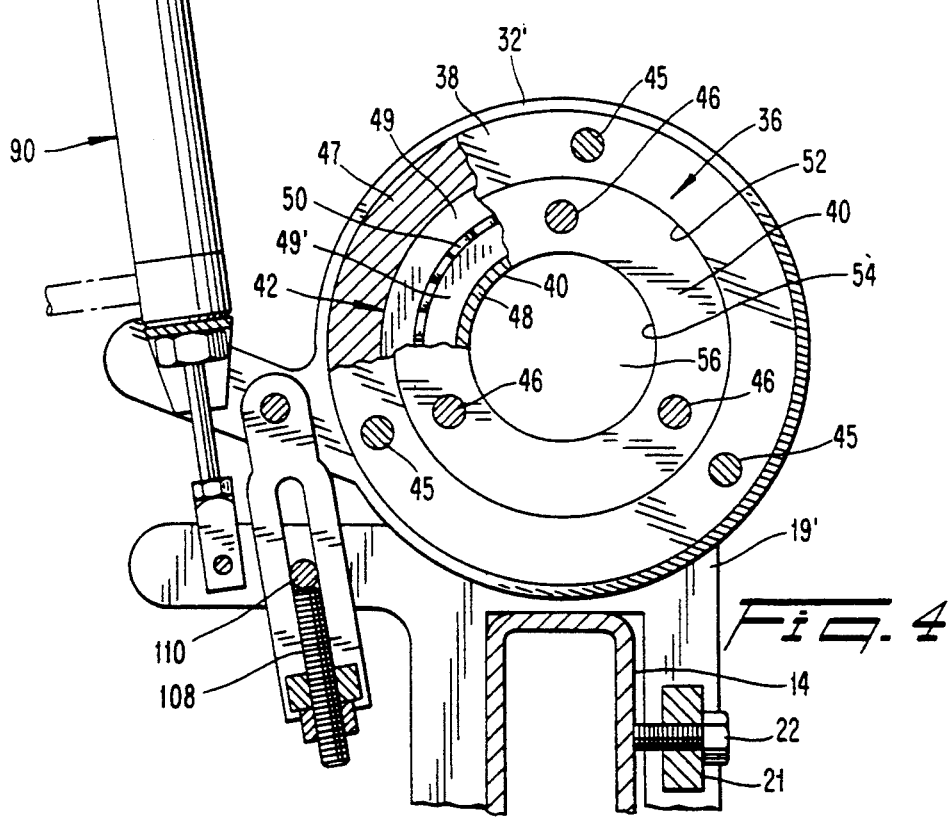
FIG. 4 is a view similar to FIG. 3 when the guide apparatus has been shifted to its guiding position, and with a portion thereof broken away to expose a roller bearing mechanism.
Figure 5:
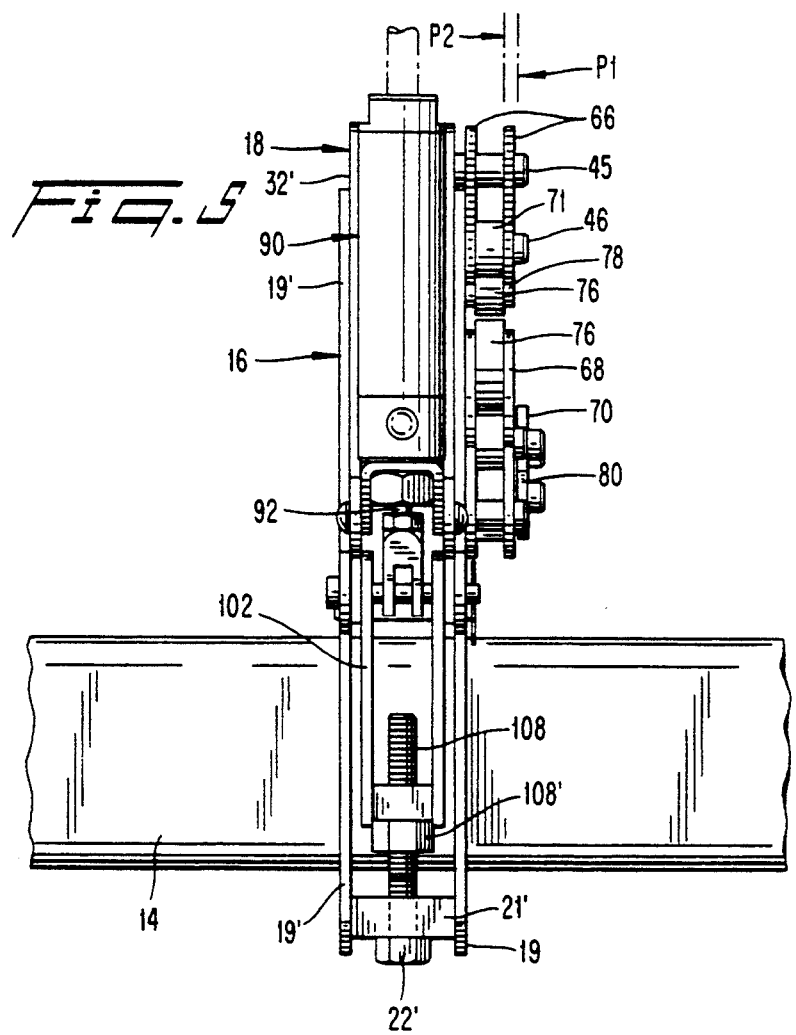
FIG. 5 is a side edge view of the apparatus depicted in FIG. 1.

In the non-guiding positions (FIG. 1), the guide rollers 76 are located adjacent the outer periphery of the central passage 56. The guide rollers 76 travel radially inwardly toward the longitudinal axis when the guide fingers are shifted to the guiding positions (FIG. 2).

Since the drive pins 45 (FIG. 7) and guide fingers rotate about spaced apart axes, the distance between each drive pin 45 and its respective pivot pin 46 will change slightly as the guide fingers rotate. This change in distance is accommodated by the slots 72.

When the guide rollers 76 are moved into their guiding positions (FIG. 2) they will support an elongated cylindrical member M for rotation about the longitudinal axis L. In order to ensure that the elongated member is properly captured between the guide rollers 76, a pick-up finger 80 is joined to one of the arms 64. The pick-up finger includes an upwardly facing concave surface 82. In practice, as the guide finger 64 is rotated toward its guiding position, the pick-up finger 80 raises the elongated member M and positions it within a guide region in which it is centralized by the three guide bearings 76. In the absence of the pick-up finger 80, it would be necessary for a operator to manually hold the elongated member centrally within the passage 56.

In order to enable the pick-up finger 80 to travel across the adjacent guide finger 62, the arm 70 on which the pick-up finger 80 is disposed, lies in a plane P1 (FIG. 5) which is spaced longitudinally of the plane P2 in which the adjacent arms 66 and 68 are disposed.

In order to rotate plates 32, 32' and outer bushing 42 (FIG. 7), an air or hydraulic cylinder 90 is provided. A cylinder rod 92 of the cylinder 90 is threaded into a clevis 95. An L-shaped bracket 99 is threaded onto cylinder body 90, and is attached to plates 32, 32' by pins 97, 97'. The rod clevis 95 of cylinder 90 is attached to plates 19, 19' by a shoulder pin 93.

By applying air or hydraulic pressure to the cylinder, the cylinder rod 92 is extended, or retracted, thereby producing rotation of the second plates 32, 32' relative to the non-rotary first plates 19, 19' in order to rotate the guide fingers 60, 62, 64 (FIG. 2) relative to the elongated member M.

A limit stop device 100 (FIG. 7) is provided which comprises a pair of plates 102, upper ends of which are pivotably connected to second plates 32, 32' by means of a pin 104. Lower ends of the plates 102 are joined together by a block 106 which is welded to both plates 102. Projecting upwardly through a threaded hole in the block 106 is a stop screw 108, and mounted on screw 108 is a lock nut 108'.

A stop pin 110 extends between plates 19, 19' and is positioned so as to be contacted by an upper end of the stop screw 108, and thereby prevent rotation of the second plates 32, 32' past the guiding position, determined by the diameter of the rotating member M (FIG. 2).

By rotating the stop screw 108, the upper end thereof can be vertically adjusted. The purpose of the stop 108, 110 will be explained below.

In operation, a plurality of guide units 10 shown in FIG. 1 are mounted on the rail 14 at longitudinally spaced locations. The guide apparatuses 10 can be adjusted longitudinally to desired locations along the rail 14 and then secured in place by tightening the bolts 22, 22'. In doing so, the edges 23, 23' of the stationary plates 19, 19' are drawn against corresponding sides of the rail to precisely locate the guide apparatus 10 relative to the rail. An elongated member M, such as a solid cylindrical metal bar which is to undergo a machining operation, such as turning for example, is inserted through the passages 56 (FIG. 1) of the guide apparatuses and into the metal working equipment. The elongated member M is inserted through the guide apparatuses 10 while the guide fingers 60, 62, 64 are in non-guiding positions, whereupon the elongated member M rests on the bottom of the passage 56 (see FIG. 1). The cylinder 90 of each guide apparatus is then pressurized in order to rotate the plates 32, 32'. The drive pins 45 are thus rotated to cause the guide fingers 60, 62, 64 to swing to their guiding positions (FIG. 2) whereupon the guide rollers 76 engage the outer surface of the elongated member M at equally spaced locations. During this step, the pick-up finger 80 will engage and raise the elongated member M to a proximate center, thereby ensuring that the elongated member is automatically centered without the assistance of an operator.

At this time, the stop screw 108 (FIG. 4) is advanced in order to engage the stop pin 110, thereby defining a position of maximum travel of the guide fingers for reasons to be explained.

The metal working operation may then commence, wherein the workpiece is rotated at high speed and progressively advanced longitudinally. The guide rollers 76 (FIG. 2) permit such longitudinal movement. The rotation of the workpiece is accommodated with minimal friction by the freely rotatable guide rollers 76 (FIG. 2) and is confined against radial movement by the force of the pressurized cylinder 90 acting on the guide fingers 60, 62, 64. Hence, minimal noise is generated.

As the rotating elongated member M is advanced longitudinally, its rear end will eventually travel longitudinally past the guide rollers 76 of the last guide apparatus. Accordingly, that end is no longer supported radially, and it may tend to undergo a slight whipping action as it rotates. Due to the presence of the stop 108, (FIG. 4) the guide fingers 60, 62, 64 will not be permitted to advance closer to one another under the action of the still-pressurized cylinder 90 (FIG. 7) even though the guide rollers 76 are no longer abutting the elongated member M (FIG. 2). As a result, the radially inner ends of the arms 66, 68, 70 (FIG. 7) will remain radially spaced from the whipping end of the elongated member by a sufficient distance to avoid being damaged thereby.

Although the above-described embodiment utilizes rotation of the second plate assembly for displacing the guide fingers, it would also be possible to displace the guide fingers by rotating the first plate assembly relative to the second plate assembly. For example, FIGS. 8 and 9 depict an embodiment of a guide apparatus 110 wherein the plates 132 of the second plate assembly 118 include lower portions which are attached to the rail 14, and the first plate assembly 116 is rotatably mounted on the second plate assembly 118.

Rotation of plate assembly 116 in relationship to stationary plate assembly 118 is produced by a cylinder (not shown) similar to that described in FIGS. 1–7.

By rotating the first plate assembly 116 (FIG. 9) the pins 146 (FIG. 9) will act as drive pins to rotate the guide fingers 160, 162, 164 about the pins 145. A pick-up finger could be joined to the guide finger 162 if desired.

Another embodiment of the invention is depicted in FIGS. 10–17. In that embodiment a guide apparatus 200 (FIG. 17) comprises a first pair of plates 220, 220' which are joined together by a plurality of circumferentially spaced hollow sleeves 222 that are welded to both of the plates 220, 220'.

A second pair of plates 230, 230' are joined together by a plurality of circumferentially spaced hollow sleeves 232 that are welded to both of the plates 230, 230'.

The guide apparatus 200 is mounted on a hollow cylindrical support tube 224 which is used in lieu of the previously described rail 14 (FIG. 7). A number of guide apparatuses 200 (FIG. 17) would normally be mounted to the support tube 224 in longitudinally spaced relationship. The support tube 224 extends longitudinally through a central passage 256 defined by the plates 230, 230' which are welded to the tube 224.

Stationary pins 228 (FIG. 17) extend between the plates 230, 230'. The ends of those pins 228 extend beyond the outer sides of the plates 220, 220' and carry freely rotatable bearing sleeves 234. The bearing sleeves 234 are retained on their pins 228 by any suitable means such as by conventional retaining rings 235. The internal diameter of plates 220, 220' is dimensioned to have a diametrical running fit clearance on the bearings 234. Since the bearing sleeves 234 are rotatable, there will occur minimal frictional wear on the plates 220, 220' and pins 228. In case that a bearing sleeve 234 wears out, it can be easily replaced because it is readily accessible on the exterior of the guide apparatus.

Figure 12:
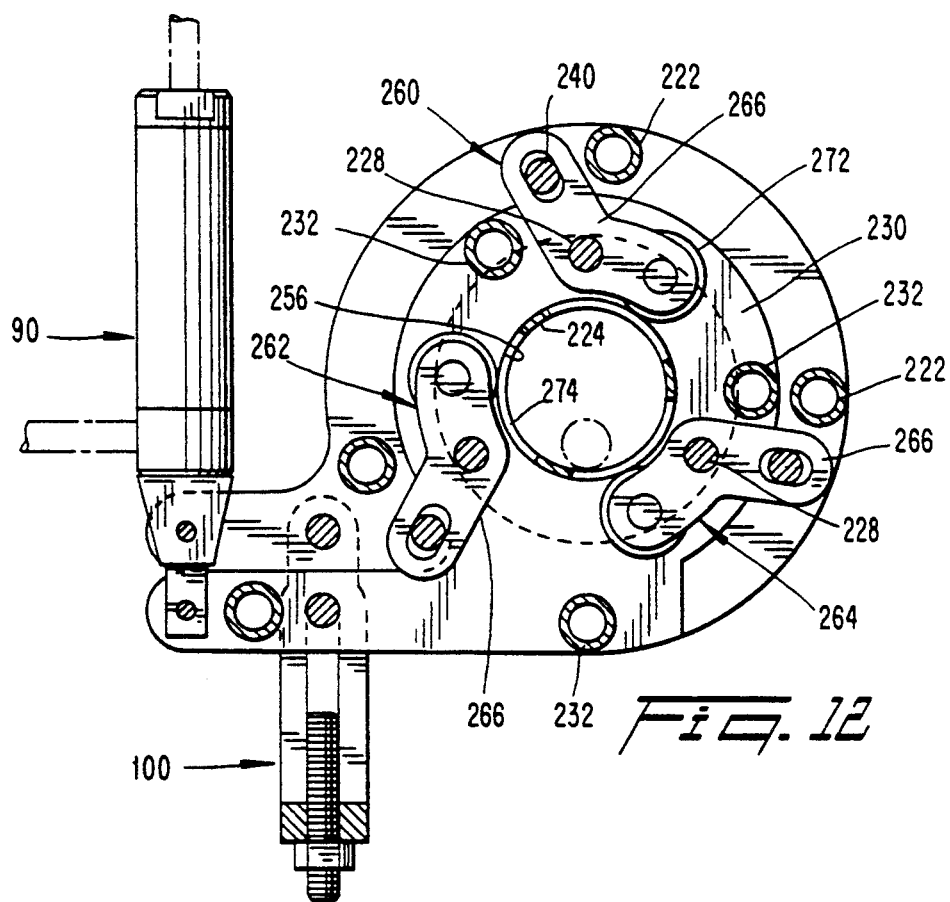
FIG. 12 is a cross-sectional view taken along the line 12—12 in FIG. 10, and with the guide apparatus in a non-guiding position.

A plurality of circumferentially spaced pins 240 (FIG. 17) extend between the plates 220, 220' to define drive pins for guide fingers 260, 262, 264. Each of those guide fingers comprises a pair of arms 266 interconnected by a hollow sleeve 268 (FIG. 14) (also shown at 71 in FIG. 7). The arms 266 (FIG. 17) are pivotally mounted on one of the pins 228 so as to be pivotable between a guiding position (FIG. 13) and a non-guiding position (FIG. 12).

Figure 13:
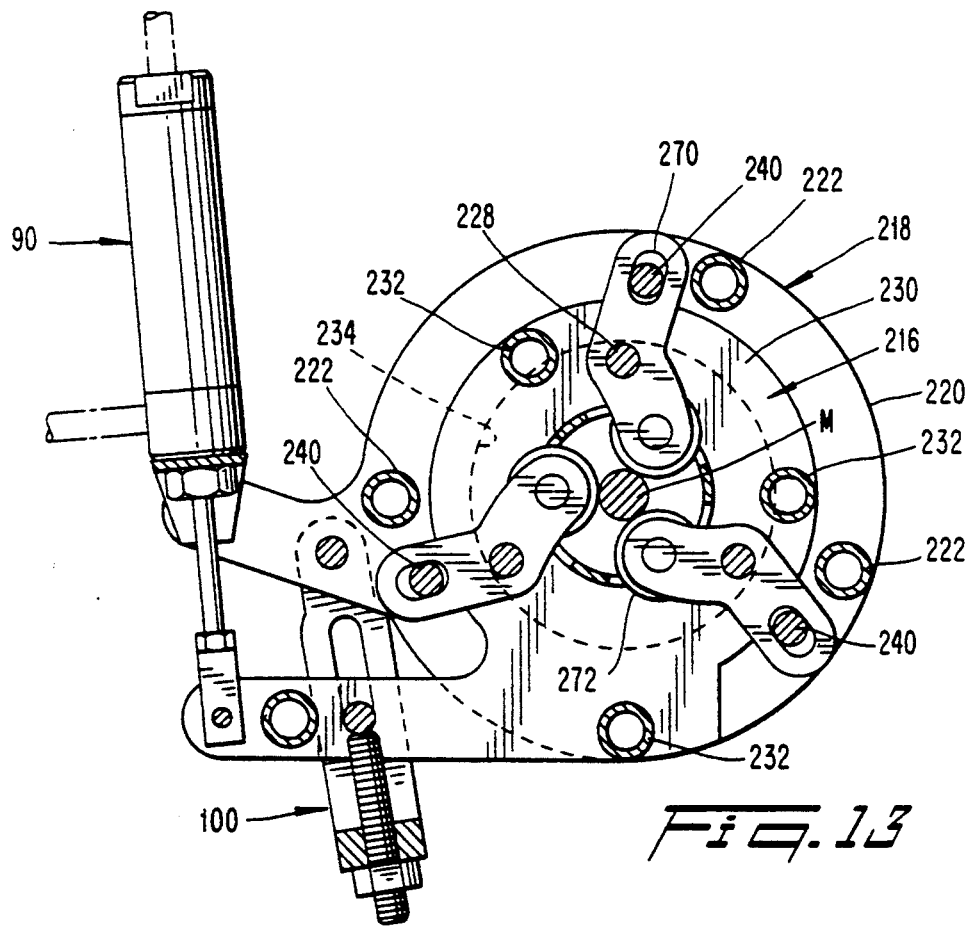
FIG. 13 is a view similar to FIG. 12 after the guide fingers have been shifted to a guiding position.
Figure 14:
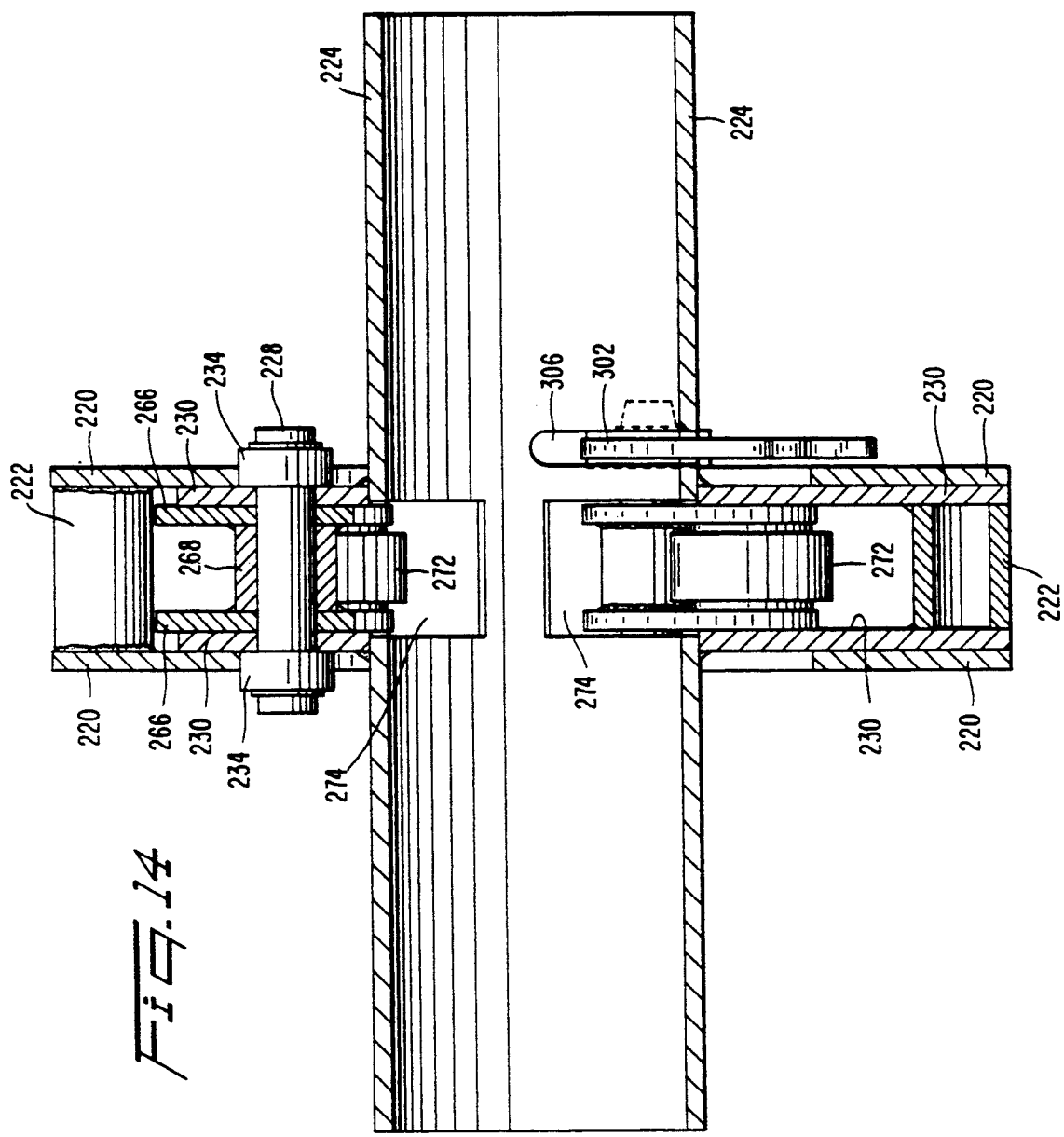
FIG. 14 is a longitudinal sectional view taken along the line 14—14 in FIG. 11.
Figure 15:
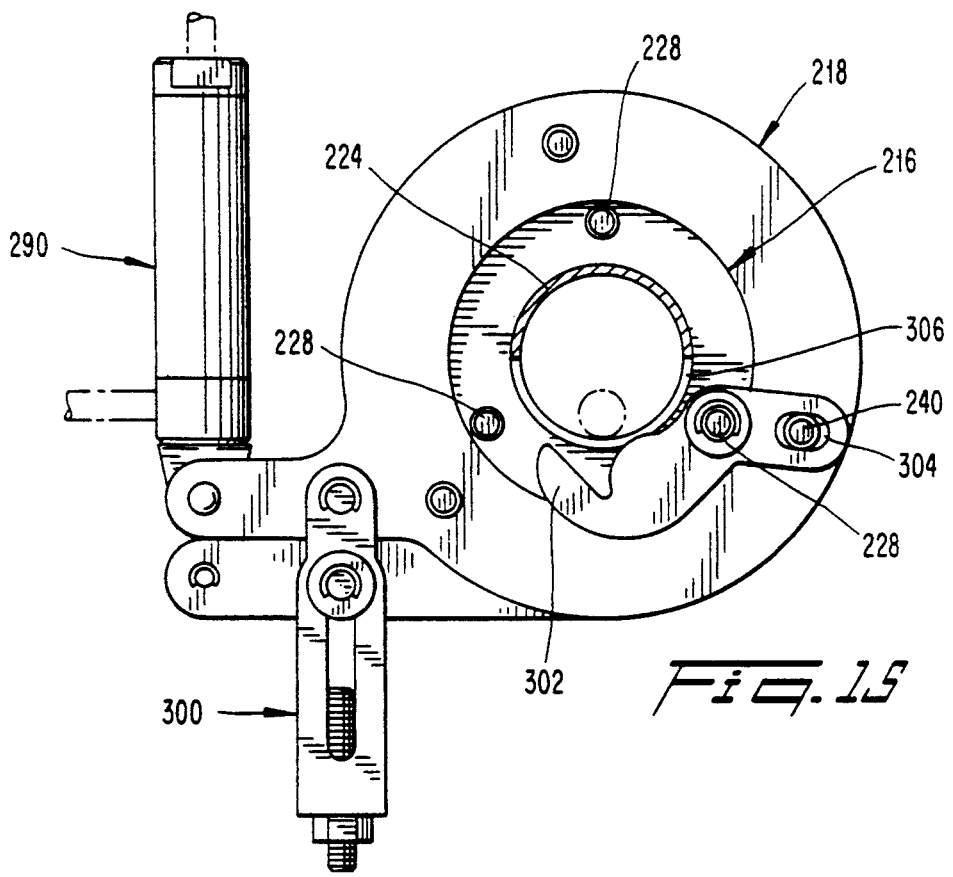
FIG. 15 is a cross-sectional view taken along the line 15—15 in FIG. 10, with the guide finger and pick-up finger being in a non-guiding position.
Figure 16:
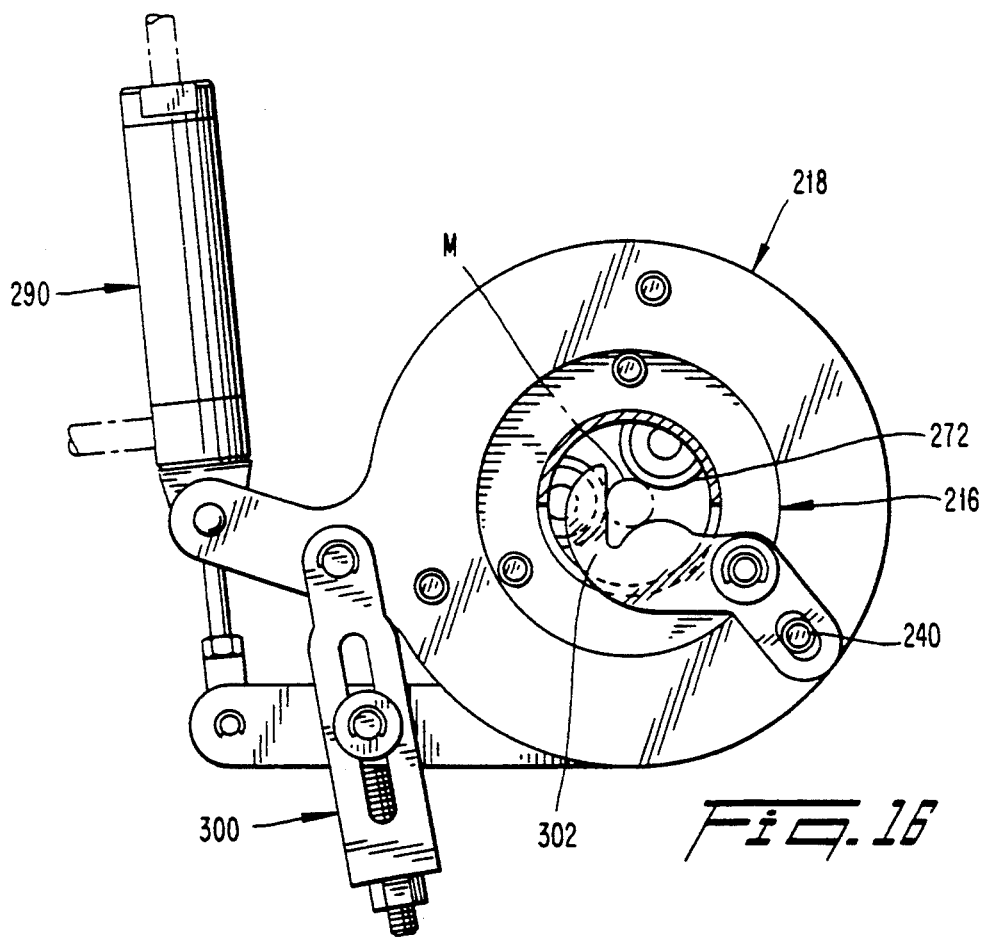
FIG. 16 is a view similar to FIG. 15 after the guide fingers and pick-up finger have been shifted to a guiding position.

The outer end of each arm 266 (FIG. 17) includes a slot 270 which receives one of the drive pins 240. Guide bearings 272 are freely rotatably mounted between the arms 266 of respective guide fingers 260, 264, 266. When the plates 220, 220' (FIG. 13) are rotated, the guide fingers swing such that the guide rollers 272 move toward or away from an elongated member M (FIG. 13). The guide fingers 260, 262, 264 (FIG. 12) project through respective slots 274 (FIG. 12) cut in the tube 224 in order to reach the elongated member M (FIG. 13).

In order to rotate plates 220, 220' (FIG. 13) an air or hydraulic cylinder 100 is mounted in the same fashion as described with respect to the previous embodiment of FIGS. 1–7.

By applying air or hydraulic pressure to the cylinder 90, its piston rod is extended or retracted, thereby producing rotation of the rotary second plate 220, 220' relative to the non-rotary plates 230, 230' in order to rotate the guide fingers 260, 262, 264 against the elongated member M (FIG. 13). A stop device 100, similar to and for the same purpose as the one earlier described in connection with FIGS. 1–7.

The actuation of the cylinder 90 (FIG. 13) produces rotation of plates 220, 220' (FIG. 17) such that the guide fingers 260, 262, 264 rotate about the pins 228 to engage the elongated member M (FIG. 13) in similar fashion to the embodiment described in connection with FIGS. 1–7.

Figure 17:
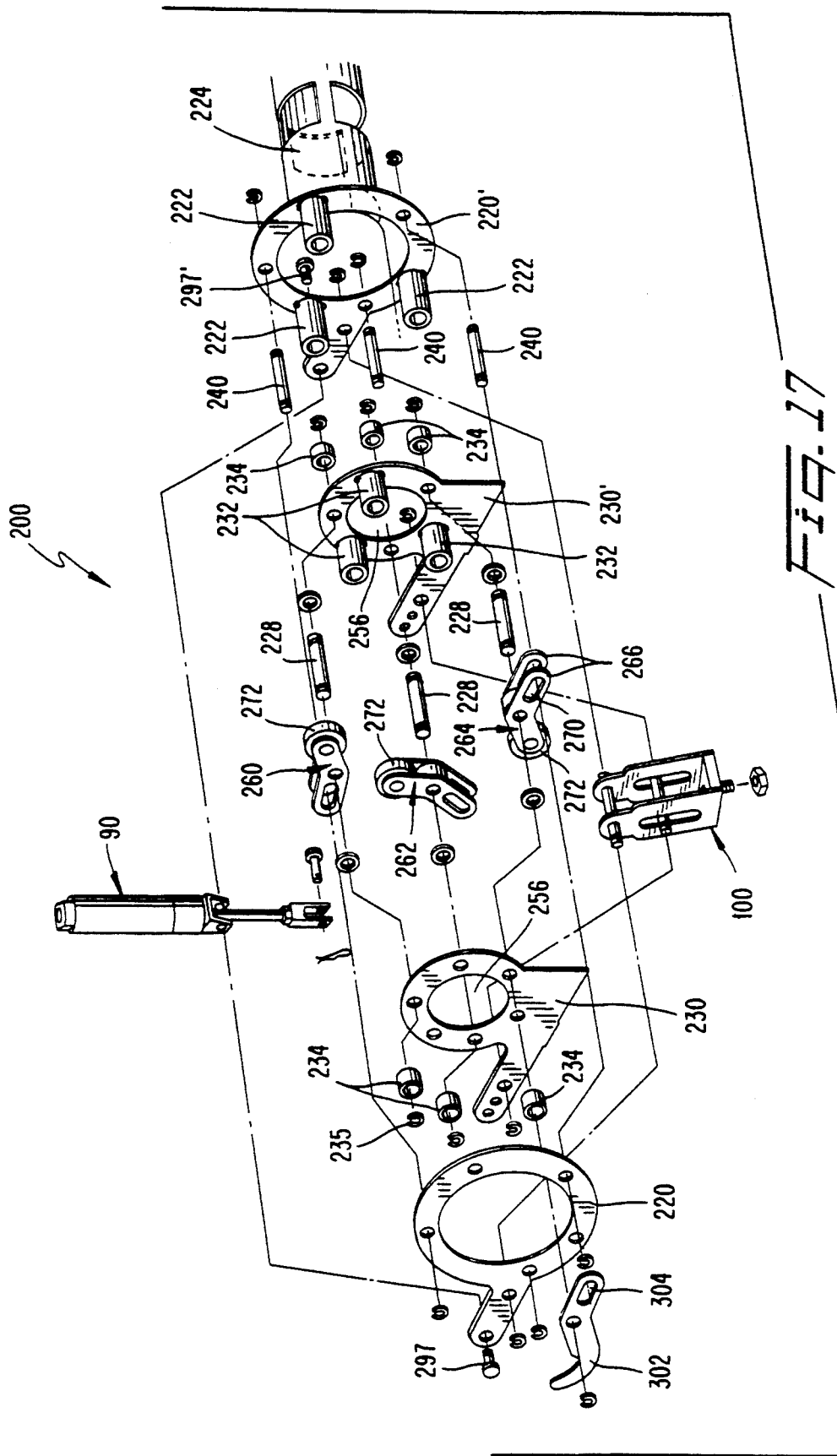
FIG. 17 is an exploded perspective view of the apparatus depicted in FIGS. 8–16.

A pick-up finger 302 (FIG. 15) similar to the earlier described finger 80 (FIG. 7) is mounted with guide finger 264 (FIG. 17). In that regard, the pick-up finger 302 is longitudinally spaced from the guide finger 264 and is pivotably mounted on the same pin 228 on which the guide finger 264 is mounted. A slot 304 is formed in the pick-up finger, and that slot receives the same drive pin 240 which drives the guide finger 264. Hence, the guide finger 264 and the pick-up finger 302 are constrained to be swung up and down together. The tube 224 contains a slot 306 (FIG. 14) which enables the pick-up finger 302 to enter the tube and raise an elongated member M (FIG. 13) to center line proximity.

Figure 18:
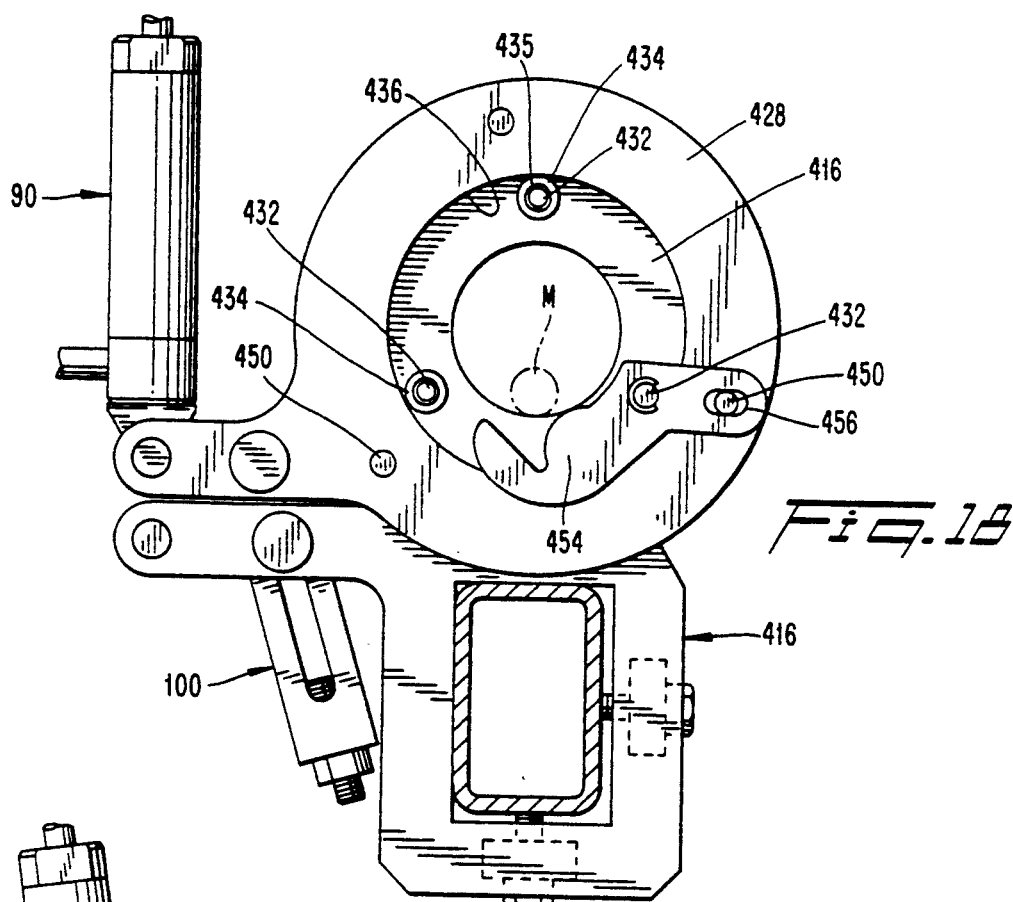
FIG. 18 is a front elevational view of a fourth preferred embodiment of the invention, with the guide fingers and pick-up finger in a non-guiding position.
Figure 19:
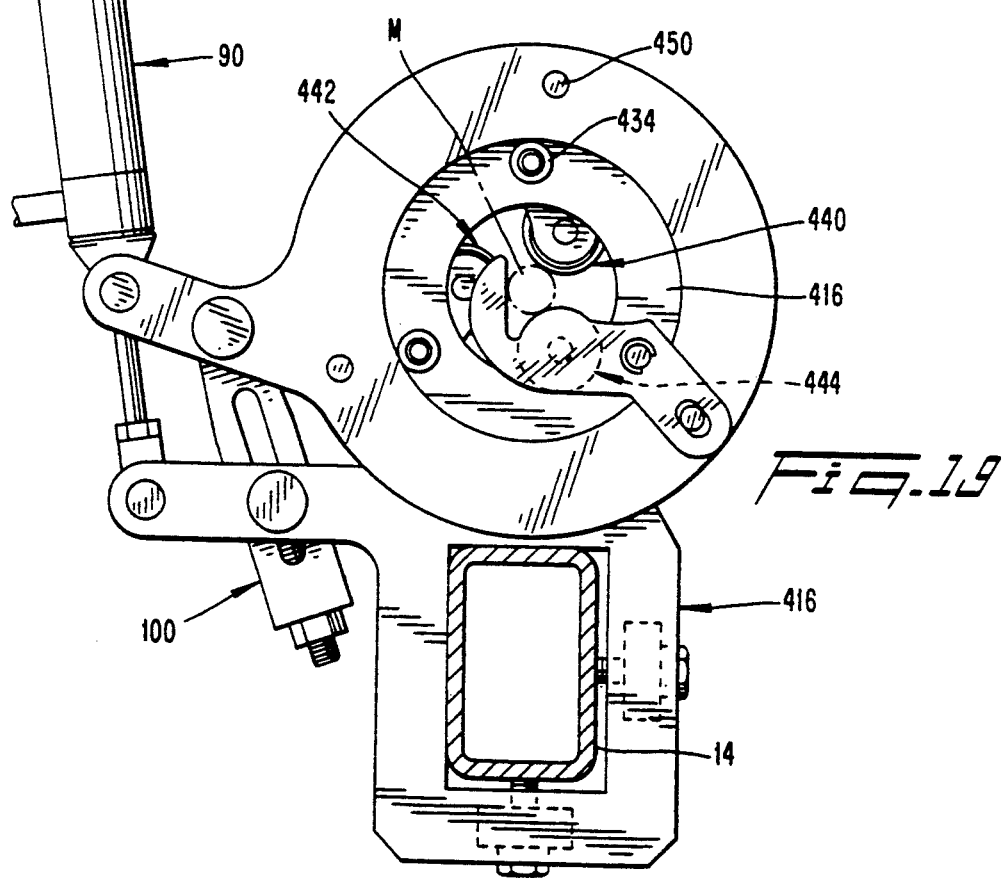
FIG. 19 is a view similar to FIG. 18 after the guide fingers and pick-up fingers have been moved to a guiding position.

Yet another embodiment of the invention is depicted in FIGS. 18–19 and 23. In that embodiment, the guide apparatus is similar to that of FIGS. 10–17, except that the assembly is mounted on a rectangular rail 14 (as previously depicted in FIG. 7). Lower parts of plates 416 (FIG. 18) would be identical to that of plates 19, 19' (FIG. 7) and their assembly would be identical to that of assembly 200 (FIG. 17).

Stationary pins 432 (FIG. 18) extend between plates 416, 416' in a direction parallel to the longitudinal axis. The ends of those pins 432 extend beyond the outer sides of the plates 416, 416' and carry freely rotatably bearing sleeves 434. The bearing sleeves 434 are retained on their pins 432 by any suitable means, such as by conventional split retaining rings. The plates 428 include central holes having an annular machined surface 436 which rotates on the bearing sleeves 434. Since the bearing sleeves 434 are rotatable, there will occur minimal frictional wear on the plates and pins as the plates 428, 428' rotate. Moreover, should the bearing sleeves 434 wear out, they can be easily replaced because they are readily accessible on the exterior of the guide assembly.

Guide bearings 440, 442, 444 (FIG. 19) are positioned between the plates 416, 416' (FIG. 23) and are pivotably mounted on the pins 432 (FIG. 18).

Pins 450 extend between the plates 428, 428' (FIG. 18) in a direction parallel to the longitudinal axis. Those pins 450 pass through slots 456 formed in the guide fingers and function as drive pins to rotate the guide fingers in the manner described earlier.

A pick-up finger 454 (FIG. 18) is situated longitudinally outside of the plane of the plate 428 and is pivotably mounted on one of the pins 432 (FIG. 18). One of the drive pins 450 extends through a slot 456 formed in the pick-up finger 454 to rotate the pick-up finger simultaneously with the guide fingers and the associated guide rollers 444 (FIG. 19).

The previously described embodiments of the invention are able to effectively support a rotating, longitudinally advancing elongated member M of circular cross-section. However, in another embodiment of the invention, elongated members of non-circular cross-section can be accommodated as well. In that regard, attention is directed to FIGS. 20–23 which depict an adapter 500 (FIG. 21) comprising a cylinder 502 bounded at its ends by rings 504. The cylinder 502 and rings are solid, except for a through-hole 506 of non-circular (in this case, square) cross-sectional shape corresponding to that of the elongated member. That is, the through-hole is sized to slidably receive an elongated member M' of corresponding cross-sectional shape (FIG. 23).

In practice, the adapter 500 (FIG. 20) is inserted into the center of the guide apparatus, depicted in FIG. 23 by being inserted between the three bearings 440, 442, 444 (FIG. 19), then the cylinder 420 (FIG. 18) is extended forcing guide rollers 440, 442, 444 (FIG. 19) inwardly until they contact surface 502 (FIG. 21) and centralize the adapter 500. As a result, the adapter is held radially and longitudinally in place by the guide fingers. The adapter is thus free to rotate together with the elongated member M' which is extended through the through-hole 506 (FIG. 20) after the adapter 500 has been thus installed.

The longitudinal advancement of the elongated member M can be effected in any conventional manner. However, the principles of the present invention are also applicable to the design of a reciprocating shuttle device 590 for longitudinally advancing the member (see FIGS. 24 and 25).

The shuttle device 590 includes a guide apparatus 600 comprised of a pair of rotary plates 620 mounted between a pair of non-rotary plates 630. The rotary plates 620 are fixed together by sleeves 622, and the non-rotary plates are interconnected by sleeves 632. The rotary plates carry guide fingers 660, 662, 664 which pivot about respective pins 628 that extend between the rotary plates 620. Those pins 628 project beyond the plates 620 and carry rotary bearing sleeves 634. An internal diameter of each of the non-rotary plates 630 has a running fit clearance with the bearing sleeves 634 such that the inner diameter of the non-rotary plates 630 rotatably support the rotary plates 620.

A limit stop device 100, similar to that disclosed earlier herein is operably connected to the rotary and non-rotary plates in order to rotate the rotary plates relative to the non-rotary plates.

The non-rotary plates 630 are reciprocally mounted on a pair of guide rods 670 which are fixed to brackets 672. The brackets 672 are, in turn, attached to the rail 14, e.g., by screws 674, 674' in similar fashion to the screws 22, 22' described in connection with FIG. 1. The screws are threaded in spacer plates 676 which interconnect respective pairs of the brackets. If necessary, the brackets could be welded to the rail 14.

The guide rods 670 are mounted in holes 678 formed in the brackets and are thus stationary and oriented parallel to the rail 14. A pair of hollow tubes 680 extend between the non-rotary plates 630 and are welded thereto. The guide rods 670 extend through those tubes.

Connected to one of the brackets 672 is a fluid actuated cylinder 682 (i.e., a pneumatic or hydraulic cylinder). A piston rod 684 extends from the cylinder 682 and passes through holes 686 formed in the adjacent pair of brackets 672 before being connected to one of the non-rotary brackets 630. By extending and retracting the piston rod 684, the guide apparatus 630 is reciprocated in a direction parallel to the rail. It will be appreciated that if the guide rollers 672 are in their guiding positions in engagement with the elongated member M when the piston rod 684 is actuated, then the member M will be longitudinally displaced along with the guide apparatus 600. Thus, by actuating the guide rollers 672 to their guiding positions during travel of the guide apparatus 600 in a first direction (i.e., toward a metal working machine), and then moving the guide rollers to their release positions during travel of the guide apparatus 600 in a second, opposite direction, the rotating member M will be advanced in the first direction in relatively quiet, step-by-step fashion.

It will be appreciated that all of the previously described guide apparatuses supporting the member M, including the guide apparatus of the shuttle 590, can be of identical construction, thereby minimizing costs.

The present invention provides a novel guide apparatus which quietly guides an elongated member for high-speed rotation while permitting the elongated member to travel longitudinally. The pick-up finger ensures that the elongated member will be centered without the need for an operator. The limit stop mechanism ensures that the end of the elongated member will not damage the guide apparatus as it passes longitudinally therethrough. The guide apparatus can be conveniently utilized as a shuttle device for longitudinally displacing the elongated member.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A guide apparatus for supporting an elongated member along a longitudinal axis of support, comprising:
   a bearing assembly including
      an inner race having a central passage which defines a longitudinal center axis coinciding with said longitudinal axis of support, said inner race having first and second axially spaced sides,
      an outer race having an annular inner surface forming a hole in which said inner race is coaxially disposed, said inner surface being spaced radially outwardly of an annular outer surface of said inner race to form an annular space therebetween, said outer race having first and second axially spaced sides situated adjacent said first and second sides, respectively, of said inner race, and
      a plurality of freely rotatable bearing elements disposed in said annular space for facilitating relative rotation between said inner and outer races about said center axis;
   at least three guide fingers mounted externally of said bearing assembly so as to be situated axially outside of and adjacent said first sides of said inner and outer races, respectively, each guide finger being rotatably mounted to said inner and outer races for rotation about outer and inner secondary axes, respectively, which are oriented parallel to said center axis, said outer secondary axis being spaced farther from said center axis than said inner secondary axis;
   one of said inner and outer bearing races and its associated secondary axes being rotatable relative to the other of said inner and outer bearing races and its associated secondary axes about said center axis to produce individual rotation of said guide fingers, such that inner ends of said guide fingers are movable toward said center axis and into supporting relationship with the elongated member in response to relative rotation between said inner and outer bearing races in a first direction, and are movable away from said center axis and out of said supporting relationship in response to relative rotation between said inner and outer bearing races in a second direction; and power actuating means connected to said one bearing race for rotating said one bearing race relative to said other bearing race.

2. A guide apparatus according to claim 1, wherein said bearing assembly includes a pair of inner plates fixedly connected to said first and second sides, respectively, of said inner race and extending radially outwardly therebeyond to form an annular channel, a pair of outer plates fixedly connected to said first and second sides, respectively, of said outer race and being situated within said channel so as to be constrained axially by said inner plates, said guide fingers being rotatably mounted to one of said inner plates and one of said outer plates.

3. A guide apparatus according to claim 1, wherein each of said second axes is defined by an inner pin extending parallel to said center axis and connected to said inner race, each guide finger being connected to its respective inner pin for relative rotation, each of said third axes being defined by an outer pin extending parallel to said center axis and connected to said outer race, each guide finger being connected to its respective outer pin for relative rotation and relative linear movement.

4. A guide apparatus according to claim 3, wherein said outer race constitutes said one race, and said inner race constitutes said other race.

5. A guide apparatus according to claim 1 including a pick-up finger operably connected to one of said guide fingers for common movement therewith from a lower position to an upper position, for raising the elongated member into a guide region defined between inner ends of said guide fingers when said guide fingers are moved to their guiding positions.

6. A guide apparatus according to claim 1 including adjustable stop means for positively limiting the extent to which said inner ends of said guide fingers can be moved radially inwardly.

7. A guide apparatus according to claim 1, wherein said elongated member constitutes an elongated rotary member, a guide roller being mounted at an inner end of each of said guide fingers for free rotation about an axis extending parallel to said center axis, said guide rollers supporting said elongated member for rotation about said center axis.

8. A guide apparatus according to claim 7, wherein each guide finger includes a pair of parallel arms, each guide roller being mounted between said arms of its respective guide finger.

* * * * *